(12) United States Patent
Shah

(10) Patent No.: US 10,545,973 B2
(45) Date of Patent: Jan. 28, 2020

(54) SYSTEM AND METHOD FOR PERFORMING DYNAMIC ORCHESTRATION OF RULES IN A BIG DATA ENVIRONMENT

(71) Applicant: Wipro Limited, Bangalore (IN)

(72) Inventor: Vikas Shah, Phoenixville, PA (US)

(73) Assignee: Wipro Limited, Bangalore (IN)

(*) Notice: Subject to any disclaimer, the term of this patent is extended or adjusted under 35 U.S.C. 154(b) by 427 days.

(21) Appl. No.: 15/222,776

(22) Filed: Jul. 28, 2016

(65) Prior Publication Data
US 2018/0032565 A1 Feb. 1, 2018

(51) Int. Cl.
G06F 17/30 (2006.01)
G06F 16/2458 (2019.01)

(52) U.S. Cl.
CPC .............................. *G06F 16/2465* (2019.01)

(58) Field of Classification Search
CPC .................. G06F 17/30539; G06F 16/2465
See application file for complete search history.

(56) References Cited

U.S. PATENT DOCUMENTS

| | | | |
|---|---|---|---|
| 9,081,472 B2* | 7/2015 | Knospe | G06F 3/0481 |
| 9,141,942 B2 | 9/2015 | Malkin et al. | |
| 2002/0133424 A1* | 9/2002 | Joao | G06Q 20/203 |
| | | | 705/22 |
| 2003/0090514 A1 | 5/2003 | Cole et al. | |
| 2006/0041458 A1* | 2/2006 | Ringrose | G06Q 10/06 |
| | | | 705/7.11 |
| 2009/0204472 A1* | 8/2009 | Einhorn | G06Q 20/20 |
| | | | 705/14.38 |
| 2010/0036684 A1* | 2/2010 | McNamee | G06Q 40/08 |
| | | | 705/4 |
| 2011/0258138 A1* | 10/2011 | Kulkarni | G06Q 10/10 |
| | | | 705/348 |

(Continued)

OTHER PUBLICATIONS out-law.com, "Better Use of 'Big Data' Can Boost UK Productivity, But Privacy Issues Must Be Addressed, Say MPs", website, Feb. 12, 2016, Retrieved from: http://www.out-law.com/en/articles/2016/february/better-use-of-big-data-can-boost-uk-productivity-but-privacy-issues-must-be-addressed-say-mps/, Pinsent Masons LLP.
Natalia Drozdiak, "European Union to Scrutinize Usage of Big Data by Large Internet Companies", Online Journal, Jan. 7, 2016, Retrieved from: http://www.wsj.com/articles/european-union-to-scrutinize-usage-of-big-data-by-large-internet-companies-1453036139, Dow Jones & Company, Inc.

(Continued)

*Primary Examiner* — Jared M Bibbee
(74) *Attorney, Agent, or Firm* — Pepper Hamilton LLP

(57) ABSTRACT

The present disclosure relates to a method and system for performing dynamic orchestration of rules. The system monitors activities performed by entity in the big data environment to detect events. The events are associated with product/service. Further, the system determines scenario by analyzing data pertaining to the product or the service. The scenario comprises one or more scenario categories. Further, the scenario is correlated with the events based on the one or more scenario categories. The correlation is further validated by the system based on dimensions. Further, the system derives one or more rules for each of the correlation of the scenario and the events upon validation. The system may further apply an operational constraints and migration controls to the one or more rules to perform dynamic orchestration. Thus, the system provides one-stop solution for deriving the rules based on context of the scenarios and migrating them to target systems.

19 Claims, 4 Drawing Sheets

(56) References Cited

U.S. PATENT DOCUMENTS

| | | | | |
|---|---|---|---|---|
| 2012/0144335 | A1* | 6/2012 | Abeln | G06Q 10/06 715/771 |
| 2012/0254090 | A1* | 10/2012 | Burris | G06N 5/025 706/47 |
| 2013/0073473 | A1* | 3/2013 | Heath | G06Q 30/02 705/319 |
| 2013/0097618 | A1* | 4/2013 | Han | H01L 23/373 719/318 |
| 2013/0231975 | A1* | 9/2013 | High | G06Q 30/0201 705/7.29 |
| 2014/0006129 | A1* | 1/2014 | Heath | G06O 30/0222 705/14.23 |
| 2014/0032475 | A1* | 1/2014 | Evans | G06N 5/048 706/52 |
| 2014/0081897 | A1* | 3/2014 | Flores | G06Q 10/067 706/48 |
| 2014/0278818 | A1* | 9/2014 | Falk | G06Q 10/06375 705/7.37 |
| 2015/0356474 | A1* | 12/2015 | Day | G06Q 10/0631 705/7.11 |
| 2016/0117702 | A1* | 4/2016 | Chigurupati | G06Q 30/0204 705/7.33 |

OTHER PUBLICATIONS

Big Data Analytics Europe, "Europe's Leading Cross-Industry Event Showcasing the Latest Big Data Analytics Insights and Innovations for Large Enterprise Organisations", website, Jun. 1, 2016, Retrieved from: http://www.whitehallmedia.co.uk/bdaeurope/, Whitehall Media Ltd.

Information and Communications Technology Council (ICTC), "Big Data & The Intelligence Economy", PDF booklet, 2015, pgs. 1-30, Retrieved From: http://www.ictc-ctic.ca/wp-content/uploads/2015/12/BIG-DATA-2015.pdf, Information and Communications Technology Council—ICTC.

Strategy Institute, "3rd Annual Big Data & Analytics Summit Canada", website, Sep. 21, 2014, Retrieved from: http://www.bigdatasummitcanada.com/.

Luiz Flavio Autran Monteiro Gomes, "Snapshot of Big Data Trends in Latin America", website/PDF booklet, Winter 2014, pp. 1-88, vol. 44, No. 4, Retrieved from: https://www.nae.edu/Publications/Bridge/128772/129165.aspx, National Academy of Sciences.

Guilherme Campos, "Where Does Latin America Stand in Terms of Big Data Adoption?", website, Mar. 12, 2015, Retrieved From: http://www.nearshoreamericas.com/latin-america-stand-terms-big-data-adoption/, Nearshore Americas.

* cited by examiner

SYSTEM AND METHOD FOR PERFORMING DYNAMIC ORCHESTRATION OF RULES IN A BIG DATA ENVIRONMENT

FIELD

The present disclosure relates in general to data analytics. More particularly, but not exclusively, the present disclosure discloses a method and system for dynamic orchestration of business rules in a big data environment.

BACKGROUND

Big data analytics is an emerging technique for efficiently processing huge amount of data for different applications. One of a useful application of the big data analytics is deriving business rules for enterprises. The business rules implemented by the enterprises are not only used for taking smoother and efficient decisions, but it also helps to understand the tradeoffs. Traditionally, the business rules are derived based on predefined criteria, knowledge of compliances, market conditions, and other numerous boundaries of data associated with a particular line-of-business.

However, this traditional way for deriving the business rule does not compete with dynamic business requirements. This is because, every day scenarios and requirements are dynamically changing. It is therefore required to configure the business rules based on current situation and ongoing trend in the particular line-of-business. Off-the-shelf there exist various tools that facilitates the configuration of business rules, however, they have no capabilities to change them in real-time and include context of scenarios.

Thus, considering the context of the scenarios is one of a challenge while deriving the business rules. Apart from this issue, orchestrating the business rules is another major challenge. Currently, developers of business rule orchestration receive requirements from the business users to design the orchestration, and therefore, a manual intervention is required. Thus, there is a gap in automating the dynamic selection of business rules and its orchestration.

SUMMARY

Disclosed herein is a method and system for performing dynamic orchestration of rules in a big data environment. Activities of one or more entities are continuously monitored for detecting events. According to an aspect, the activities are basically related to transactions of products and services offered by an enterprise. Further, different scenarios are also determined along with their corresponding scenario categories. During the analysis, if any change or new pattern is detected, the system automatically replaces the existing rules with new rules. According to other aspects of present disclosure, the system performs the orchestration by migrating the rules to one or more target systems such as kiosk or point-of-sale (POS) connected with the system.

Accordingly, the present disclosure relates to a method for performing dynamic orchestration of rules in a big data environment. The method comprises the steps of monitoring activities performed by an entity in the big data environment to detect one or more events. The one or more events are associated with at least one of a product or a service. The method also comprises determining at least one scenario by analyzing data pertaining to the at least one of the product or the service. Further, the at least one scenario comprises one or more scenario categories. The method further comprises correlating the at least one scenario with the one or more events based on the one or more scenario categories. Further, the method comprises the steps of validating the correlation between the at least one scenario and the one or more events based on one or more dimensions. The one or more dimensions indicate parameters affecting the at least one scenario. The method further comprises deriving one or more rules and corresponding rule hierarchies for each of the correlation of the at least one scenario and the one or more events upon validation. Further, the method also comprises applying at least one of operational constraints and migration controls to the one or more rules to perform dynamic orchestration.

Further, the present disclosure relates to a rule orchestration system for performing dynamic orchestration of rules in a big data environment. The rule orchestration system comprises a processor and a memory communicatively coupled to the processor. The memory stores processor-executable instructions, which, on execution, causes the processor to perform one or more operations comprising monitoring activities performed by an entity in the big data environment to detect one or more events. The one or more events are associated with at least one of a product and a service. The system determines at least one scenario by analyzing data pertaining to the at least one of the product and the service. The at least one scenario comprises one or more scenario categories. Further, the system correlates the at least one scenario with the one or more events based on the one or more scenario categories. The system validates the correlation between the at least one scenario and the one or more events based on one or more dimensions. The one or more dimensions indicate parameters affecting the at least one scenario. Thereafter, the system derives one or more rules and corresponding rule hierarchies for each of the correlation of the at least one scenario and the one or more events upon validation. Finally, the system applies at least one or more of operational constraints and migration controls to the one or more rules to perform dynamic orchestration.

Furthermore, the present disclosure relates to a non-transitory computer readable medium including instructions stored thereon that when processed by at least one processor cause a rule orchestration system to perform the acts of monitoring activities performed by an entity in the big data environment to detect one or more events. The one or more events are associated with at least one of a product and a service. The rule orchestration system determines at least one scenario by analyzing data pertaining to the at least one of the product and the service, wherein the at least one scenario comprises one or more scenario categories. Further, the rule orchestration system correlates the at least one scenario with the one or more events based on the one or more scenario categories. The rule orchestration system further validates the correlation between the at least one scenario and the one or more events based on one or more dimensions, wherein the one or more dimensions indicate parameters affecting the at least one scenario. Further, the rule orchestration system derives one or more rules and corresponding rule hierarchies for each of the correlation of the at least one scenario and the one or more events upon validation. Further, the rule orchestration system applies at least one of operational constraints and migration controls to the one or more rules to perform dynamic orchestration.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
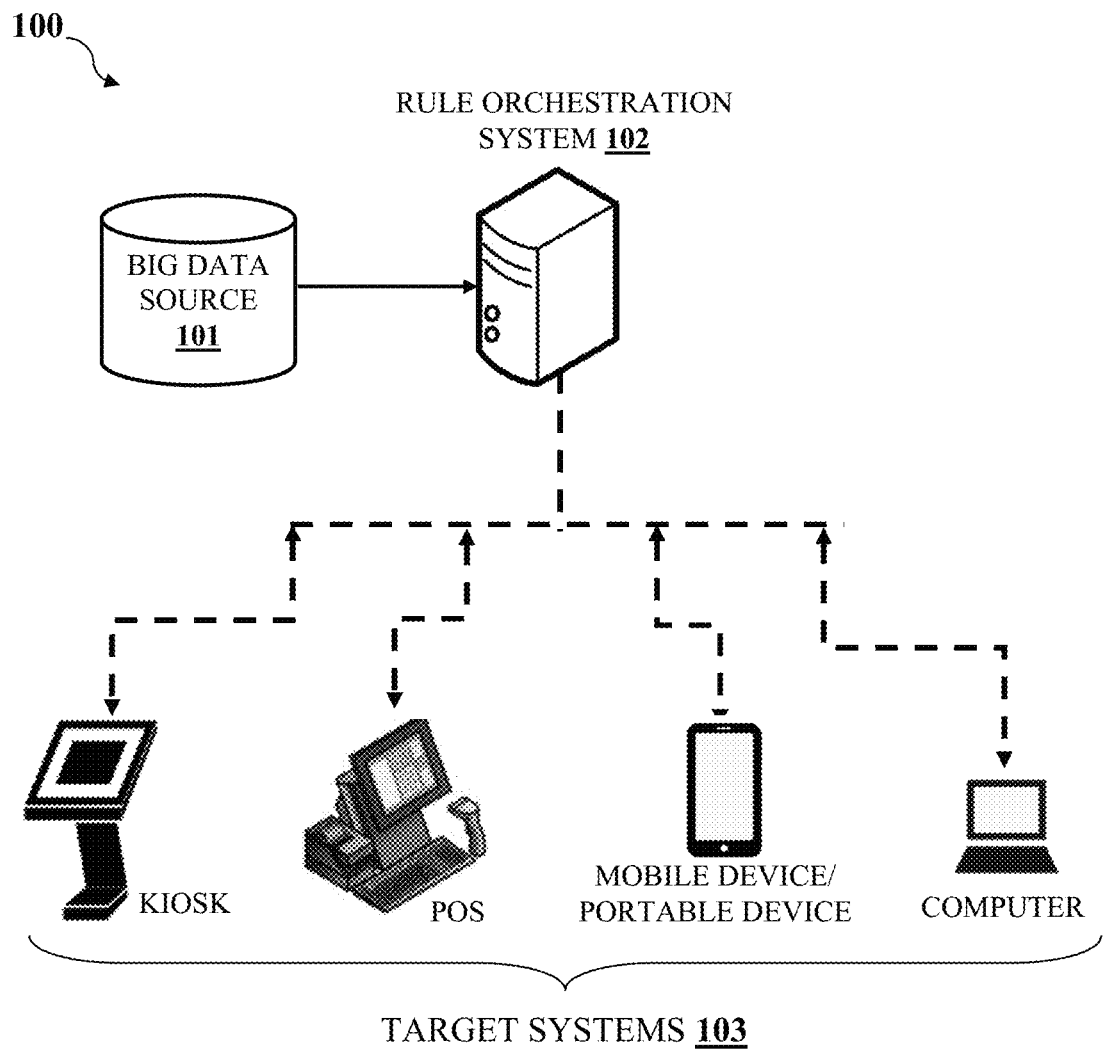
FIG. 1 shows an exemplary environment illustrating a rule orchestration system for performing dynamic orchestration of rules in a big data environment in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a rule orchestration system for performing dynamic orchestration of rules in big data environment. Although, the method for performing the dynamic orchestration of rules is described in conjunction with a server, the said method can also be implemented in various computing systems/devices, other than the server. The rule orchestration system is connected with various target systems upon which the rules are migrated during the dynamic orchestration. The rule orchestration system continuously monitors activities of entities for detecting events. The events are associated with a product or a service offered by an enterprise. The entity may be a user or a store (e.g., retail store) or any company dealing with transaction of products and/or services.

After detecting the events, various scenarios and their corresponding scenario categories are determined. For example, while monitoring the activities of the entity (e.g., retail store), the event observed/detected is that "a smart TV is on sale from past 1 week". Based on this event, the scenario determined as 'sale of smart TV'. Corresponding to the scenario, one or more scenario categories are also determined. The one or more scenario categories helps in deriving appropriate rules (which may be new rules different from currently available rules) for the product or the service. For example, the current rules, for the above scenario (i.e., sale of smart TV), suggests offering corresponding accessories to be on sale within 1 week of the initiation for the 'Smart TV sale'. However, new analysis revealed that the consumers (i.e., entity) are actually anticipating leasing or renting the accessories from either a cable or a dish provider along with extending, changing, or subscribing new services. Thus, based on this new analysis, different scenario categories may be identified. The different scenario categories may include, but not limited to, a support category or a partnership category or a charter category. Apart from the scenario categories, dimensions are also determined for deriving the rules, which is explained in detail in subsequent paragraphs of the specification.

Now, the new rules are derived based on the scenario, its corresponding scenario categories and dimensions. The new rules provide options to collaborate or partner with the cable or the dish provider for facilitating the accessories. The new rules may also provide another option to offer leasing of the accessories in competition with the cable or the dish providers. Thus, the rules dynamically differ and may depend on the above discussed factors (scenario, scenario categories and dimensions) along with diversifications in the action. Once the rules are derived, the next step performed by the system is to apply operational constraints and/or migration controls to the rules to perform dynamic orchestration of the rules. This way, the present disclosure discloses a scenario based derivation and migration of the rule orchestration in a big data ecosystem.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment illustrating a rule orchestration system for performing dynamic orchestration of rules in a big data environment.

The environment 100 comprises a big data source 101, the rule orchestration system 102 and a plurality of target systems 103 connected with the rule orchestration system 102. The big data source 101 may be a repository of a big data ecosystem for storing huge amount of data related to the enterprises, products and/or services. In an embodiment, the big data source 101 may be configured with a data sorting technique for sorting and classifying various types of data stored in the big data source 101. In an embodiment, the big data source 101 may be placed within the rule orchestration system 102.

The rule orchestration system 102 retrieves useful information from the huge amount of data stored in the big data source 101 for analysis. This useful information may comprise, but not limited to, ongoing offers/discounts on the products/services, buying behavior of customers and historical data. Based on the analysis, the rule orchestration system 102 derives one or more rules (business rules). The one or more rules may be derived in a real-time by the rule orchestration system 102. In an embodiment, the rule orchestration system 102 may include, but not limited to, a server, a computer, a workstation, a laptop, mobile phone, or any computing system/device capable of receiving, analysing and processing the useful information.

Further, the rule orchestration system 102 is connected with the plurality of target systems 103 for orchestrating the one or more rules. According to embodiments of present disclosure, the one or more rules may be migrated to any of the plurality of target systems based on operational constraints and migration control which is explained in upcoming paragraphs of the specification. Further, according to embodiments of present disclosure, the plurality of target systems 103 may include, without limitation, a kiosk, a point-of-sale (POS), a desktop computer, a portable computer, a personal digital assistant, a mobile device, a portable device, and a handheld device.

Figure 2:
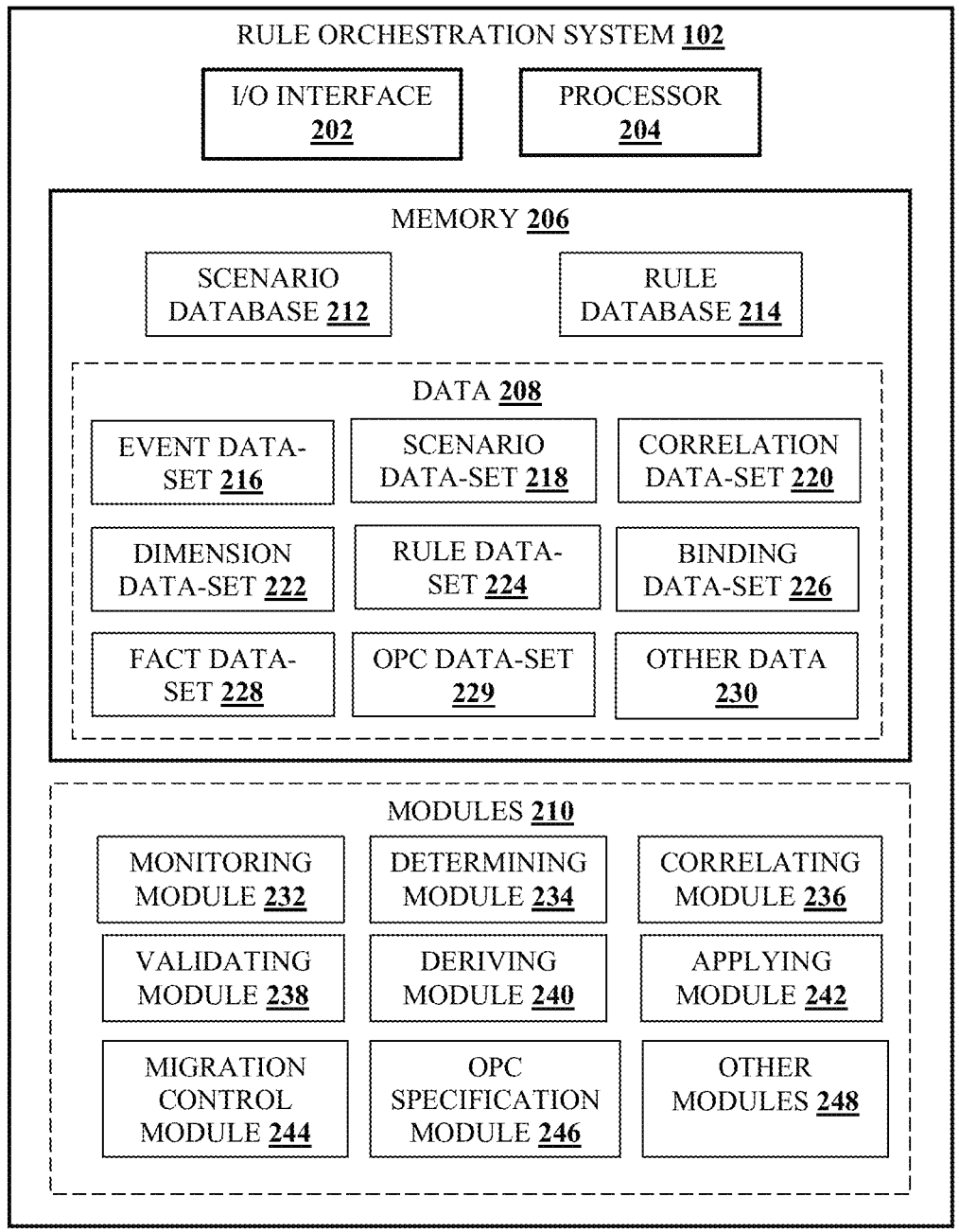
FIG. 2 shows a detailed block diagram illustrating the rule orchestration system in accordance with some embodiments of the present disclosure.

FIG. 2 shows a detailed block diagram illustrating the rule orchestration system in accordance with some embodiments of the present disclosure.

The rule orchestration system 102 comprises an I/O interface 202, a processor 204 and a memory 206. The I/O interface 202 is configured to receive one or more data, for example, the useful information from the big data source 101 associated with the big data ecosystem. The memory 206 is communicatively coupled to the processor 204. The processor 204 is configured to perform one or more functions of the rule orchestration system 102 for performing dynamic orchestration of rules in the big data environment. In one implementation, the rule orchestration system 102 comprises data 208 and modules 210 for performing various operations in accordance with the embodiments of the present disclosure. The memory further comprises a scenario database 212 and a rule database 214. In an embodiment, the data 208 may include, without limitation, an event data-set 216, a scenario data-set 218, a correlation data-set (i.e., Event-Scenario correlation data-set) 220, a dimension data-set 222, a rule data-set 224, a binding data-set (i.e., scenario to rule conditional binding data-set) 226, a fact data-set 228, an operational constraint (OPC) data-set 229, and other data 230.

In one embodiment, the data 208 may be stored within the memory 206 in the form of various data structures. Additionally, the aforementioned data 208 can be organized using data models, such as relational or hierarchical data models. The other data 230 may store data, including temporary data and temporary files, generated by modules 210 for performing the various functions of the rule orchestration system 102.

In an embodiment, the scenario database 212 represents a plurality of scenarios already known to rule orchestration system 102. However, if a new scenario is determined, it is added to the scenario database 212 in a real-time. The plurality of scenarios is associated with the products/services. With the scenarios, one or more scenario categories are associated which helps in deriving the rules for the products/services.

In an embodiment, the rule database 214 represents a list of rules which may be already known to the rule orchestration system 102. However, if new rules are determined during the analysis, the rule database 214 is updated accordingly. The rules are basically the business rules which comprise conditions and actions for a particular scenario and scenario categories.

In an embodiment, the data 208 may be processed by one or more modules 210. In one implementation, the one or more modules 210 may also be stored as a part of the processor 204. In an example, the one or more modules 210 may be communicatively coupled to the processor 204 for performing one or more functions of the rule orchestration system 102.

In one implementation, the one or more modules 210 may include, without limitation, a monitoring module 232, a determining module 234, a correlating module 236, a validating module 238, a deriving module 240, an applying module 242, a migration control module 244, an OPC specification module 246, and other modules 248. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the monitoring module 232 monitors activities performed by the entity in the big data environment to detect one or more events. The entity may be individual consumer, a retail store or a company dealing with transaction of products or services. The activities are related to transaction of the products and the services offered by an enterprise. For example, a consumer 'A' buying a smart TV (i.e., product) from the retail store, or the retail store generates an invoice corresponding to the sale of the smart TV (product), or a payment gateway performing the payment based on the invoice generated. All these activities are monitored by the monitoring module 232 based on which an event data-set is generated and stored in the memory 206 of the rule orchestration system 102. An example of the event data-set 216 is shown below.

TABLE 1

Event data-set

| Event ID | Event Type | Product or Service | Event Level | Performed By |
|---|---|---|---|---|
| E1 | Purchase | TV | 1 | Consumer |
| E1_1 | Invoice | Billing Platform | 1_1 | Retail Store |
| E1_2 | Payment | Credit Card | 1_2 | AMEX (Payment gateway) |

Three different types of events (Purchase, Invoice, and Payment) are captured while monitoring the activities of the entities (for example, consumer, retail store, AMEX). Also, an event ID and event level is associated with each of the event type. Further, the event type may be also associated with the product or the service.

In an embodiment, the determining module 234 determines one or more scenarios associated with the product or the service by analyzing the data (i.e., the scenario data-set 218) pertaining to the product or the service. The scenario data-set 218 may be stored in the scenario-database 212 of the rule orchestration system 102. An example of the scenario data-set 218 is shown in below table.

TABLE 2

Scenario data-set

| Scenario ID | Scenario | Category | Fact | Business Operation |
|---|---|---|---|---|
| S1 | Sale of Smart TV Product | Support | Accessory | Discount |
| S2 | Sale of Smart TV Product | Partnership | Cable | Concession |
| S3 | Sale of Smart TV Product | Charter | Accessory | Leasing |

With the each scenario, a scenario id, a category (i.e., scenario category), facts and business operations may be associated. In the above table 2, three different scenario categories can be seen i.e., 'Support', 'Partnership' and 'Charter'. According to embodiments of present disclosure, it may happen that a new scenario may be determined which may not be present in the scenario database 212. The determining of the new scenario is performed by following steps. At first, the determining module 234 receives one or more predefined scenarios from the scenario database 212. Then, the determining module 234 compares the scenario with the one or more predefined scenarios to determine whether the scenario is pre-existing in the scenario database 212. If the scenario is not available in the scenario database 212, the system 102 updates the scenario database 212 by adding the scenario (i.e., new scenario) in the scenario database 212. Further, the scenario is validated based on the one or more dimensions. According to another embodiment, the determining module 234 also determines the scenario categories (Support, Partnership and Charter) based on a utilization map associated with the product or the service and interrelationship amongst the product or the service.

In an embodiment, once the event, scenario and their corresponding scenario categories are determined, the correlating module 236 correlate the events (from the event data-set 216) with the scenarios (from the scenario data-set 218) based upon the one or more scenario categories determined. The correlation may be captured in the correlation data-set (i.e., event-scenario correlation data-set) 220 as shown in below table 3.

TABLE 3

Event-Scenario correlation data-set

| Event Scenario Correlation ID | Event ID | Scenario ID | Relationship Type | Status | Create Date | Change Date |
|---|---|---|---|---|---|---|
| ESC1 | E1 | S1 | Promote | Available | Nov. 26, 2015 | — |
| ESC2 | E1 | S2 | Offer | Unveil | Nov. 26, 2015 | Jun. 26, 2016 |
| ESC3 | E1 | S3 | Provision | Pending | Jun. 26, 2016 | — |

From the above table 3, it can be observed that with same event (i.e., event E1) three different scenarios S1-S3 exist in different relationship. For example, between event E1 and scenario S1, the relationship is 'Promote', whereas, the relationship between the event E1 and scenario S3 is 'Provision. Thus, the relationship is identified based on context of the scenario. Also, the correlation data-set 220 shows status, create date and change date corresponding to the each relationship between the events and the scenarios.

In an embodiment, the validating module 238 validates the abovementioned correlation based on one or more dimensions of the dimension data-set 222 stored in the rule orchestration system 102. An example of the dimension data-set 222 is shown in the below table 4.

TABLE 4

Dimension data-set

| Dimension ID | Dimension | Dimension Type | Dimension Level | Scenario Array |
|---|---|---|---|---|
| DIM1 | Advancing feature | Technology | 1 | [S1, S3] |
| DIM2 | North America | Geolocation | 2 | [S1 . . . S3] |
| DIM3 | Pricing | Economy | 1 | S2 |
| DIM4 | Rating | Social | 1 | [S1 . . . S3] |

In the above table 4, there are 4 different dimensions (Advancing feature, North America, Pricing, Rating) shown as an example. These dimensions belongs to different dimension types which includes but not limited to predefined technology dimensions, geolocation dimensions, economic dimensions, and social dimensions. However, there may be other dimensions types also like application dimensions and legal dimensions. These dimensions indicate parameters affecting the scenarios. The dimensions are continuously updated and associated with the scenarios as explained herein detail.

According to embodiments of present disclosure, the validating module 238 determines whether the dimensions are defined to correlate with the scenarios. If it is not, the validating module 238 associates the data (i.e., scenario data-set 218) pertaining to the product or the service with big data query specification. Further, the validating module 238 derives one or more dimensions (new dimensions) based on the association. According to embodiments of present disclosure, the dimensions may be derived based on the addition, deletion, and expansion of the facts. An example of a fact data-set 228 is shown below in table 5.

TABLE 5

Fact data-set

| Fact ID | Fact | Unit | SBRCB ID Array | Status | Create Date | Change Date |
|---|---|---|---|---|---|---|
| FID1 | Product | Smart TV | [SBRCB1 ... SBRCB3] | Valid | Nov. 26, 2015 | |
| FID2 | Cable | ABC Z.X | SBRCB2 | Valid | Nov. 26, 2015 | |
| FID3 | Accessory | "A" | SBRCB1 | Valid | Nov. 26, 2015 | |
| FID4 | Discount | (Value %) | SBRCB1 | Valid | Nov. 26, 2015 | |
| FID5 | Time | Week | SBRCB1 | Valid | Nov. 26, 2015 | |
| FID6 | Accessory | "B" | SBRCB3 | Valid | Nov. 26, 2015 | |
| FID7 | Lease Time | Year | SBRCB3 | Valid | Nov. 26, 2015 | |

For example, when a product "X" is introduced to a fact table, then buying patterns of the product "X" are captured through big data analysis platform. The big data analysis reveals that when buying the product "X", the consumers are utilizing store specific discount from the social media. Then, based on such analysis, a dimension "Store" is added to dimension type "Geolocation" and the dimension "Coupon" is added to the dimension type "Social". Further, from the above fact data-set, it can be observed that facts are associated with the Scenario to Business Rule Conditional Binding (SBRCB) array. The SBRCB can only leverage the hierarchies that have business rules corresponding to the same facts associated with the SBRCB. For instance, if business rule BR6 is consist of fact FID6 (table 6) and it is utilized in Hierarchy 3 (table 7) then the relationship between FID6 and SBRCB3 in table 5 indicates that Hierarchy 3 can be implied to SBRCB3 with one or more conditions as indicated in Table 8.

In an embodiment, after validating the correlation, the deriving module 240 derives one or more rules and corresponding rule hierarchies for each of the correlation of the scenario and the events. The one or more rules derived are shown in the rule data-set 224 (table 6) which is stored in the rule database 214.

TABLE 6

Rule data-set

| BR ID | Fact ID | Value | Operation | Level | Association | Create Date | Change Date | Status |
|---|---|---|---|---|---|---|---|---|
| BR1 | FID3 | $200 | >= | 1 | | Nov. 26, 2015 | | Active |
| BR2 | FID4 | 20% | == | 2 | BR1 | Jan. 2, 2016 | | Active |
| BR3 | FID5 | 2 | == | 3 | BR2 | Jan. 2, 2016 | | Active |
| BR4 | FID4 | 15% | == | 2 | BR1 | Nov. 26, 2015 | Jan. 1, 2016 | Active |
| BR5 | FID5 | 4 | == | 3 | BR2 | Nov. 26, 2015 | Jan. 1, 2016 | Active |
| BR6 | FID6 | $300 | >= | 1 | | Jan. 2, 2016 | | Active |
| BR7 | FID7 | 1 | == | 2 | BR6 | Jan. 2, 2016 | | Active |

From the above table, it can be observed that seven different rules (business rules BR1-BR7) are derived based upon the validation. With each rule, a fact id, a value, an operation, a level, an association, a create date, a change date, and a status are associated. For deriving the rules, the deriving module 240, at first, determines whether the rules are predefined in the rule database 214. Based upon the determining, the deriving module 240 identifies a level of the rules based on a rules hierarchy. Then, the deriving module 240 dynamically updates the rule hierarchy based on the data (scenario data-set 218) pertaining to the product or the service. After updating the rule hierarchy, the deriving module 240 adds the rules in the rule database 214. An example of hierarchies and associated rules is shown below in table 7.

TABLE 7

| Hierarchy 1 | Hierarchy 2 | Hierarchy 3 |
|---|---|---|
| Level 1: BR1 | Level 1: BR1 | Level 1: BR6 |
| Level 2: BR2 | Level 2: BR4 | Level 2: BR7 |
| Level 3: BR3 | Level 3: BR5 | |

It can be observed from the above table 7 that in hierarchy 1, there are 3 levels in which the rules (BR1, BR2, BR3) are arranged, whereas, in hierarchy 2, only two levels are provided in which the rules (BR6 and BR7) are arranged. After deriving the rules, the deriving module 240 may also generate the binding data-set (i.e., scenario to rule conditional binding data-set) 226 as shown in below table 8.

TABLE 8

Binding data-set

| SBRCB ID | Scenario ID | BR ID | Dimension ID | Condition | Hierarchy |
|---|---|---|---|---|---|
| SBRCB1 | S1 | BR1 | DIM1 | Product.SmartTV.value >=$1200 | Hierarchy 1 |
| SBRCB3 | S3 | BR6 | DIM1 | Product.SmartTV.value >=$400 | Hierarchy 3 |

TABLE 8-continued

| | | | Binding data-set | | |
|---|---|---|---|---|---|
| SBRCB ID | Scenario ID | BR ID | Dimension ID | Condition | Hierarchy |
| SBRCB2 | S2 | BR9 | DIM3 | and accessory is not "A" Product.SmartTV.value >=$600 and BR1 not selected | Hierarchy 4 |

In the above table 8, it can be observed that rules are associated with the scenario and the dimension. For each rule, the corresponding conditions are also associated in the above data-set. Once the rules are derived and updated and the scenario to rule conditional binding data-set is generated, dynamic orchestration of the rules are performed. The rule orchestration system 102, which is connected with the one or more target systems 103, performs the dynamic orchestration of the rules.

In an embodiment, the applying module 242 applies the at least one of an operational constraints and migration controls to the one or more rules to perform dynamic orchestration. For performing the dynamic orchestration, the one or more rules are migrated to the target systems 103. For migrating of the rules, the migration control module 244 may derive migration controls to migrate the one or more rules. There may be different types of migration controls derived by the migration control module 244.

For example, the migration control may be 'validating' in which authorized users are validated to update, modify, and version the rules and the scenario categories associated with the scenario. In another example, the migration control may be providing a notification of a change to the scenarios and their impacts to the rules. In yet another example, the migration control may be introducing additional query specification based on new or updated dimensions. In yet another example, the migration control may be retrieving updated data-sets from big data sources.

Based on the migration controls derived, the OPC specification module 246 derives operational constraints in association with the migration control. According to embodiments of present disclosure, the operational constraint may be time or may be configuration of the target system or may be conditional binding of dimensions. The operational constraint 'time' may indicate a particular interval, whereas, the operational constraint 'configuration of target systems' indicates current configuration of a particular target system. For example, the configuration of the target system 103 (Kiosk) may be so old that it cannot receive any notification from the rule orchestration system 102.

According to embodiments of present disclosure, the operational constraints may associate the migration control to the rule hierarchy in adherence to the level it needs to be implied (whether to rules, dimensions, facts, events, and scenario to rule conditional binding). The operational constraints (OPC) are implied to one or more data-sets of the rule orchestration system 102. For example, as shown in the below an operational constraint (OPC) data-set 229 in table 9, OPC1 is "notification" which is implied to hierarchy 1. If there is any change or updates occurs to scenario to rule conditional binding i.e., SBRCB1, then store manager needs to be notified.

TABLE 9

| | | Operational Constraint (OPC) data-set | | | | |
|---|---|---|---|---|---|---|
| OPC ID | Hierarchy ID | Migration Control | Constraints To | Constraints Role | Constraint Specification | Status |
| OPC1 | Hierarchy 1 | Notification Hierarchy 1_SBRCB | SBRCB1 | Store Sales Managers | Manager X of Company A, Manager Y of Company B | Active |
| OPC2 | Hierarchy 1 | Validation_Hierarchy2_BR | BR4 | Discount Database Administrator | Administrator X of Company C, Administrator Y of Company D | Active |
| OPC3 | Hierarchy 3 | Update_Hierarchy3_DIM | DIM4 | Rating Big Data Sources | USER_PROFILE_RATING database of Company X | Passive |

Similarly, OPC3 is an "update" which is implied to hierarchy 3, If there is any change or updates occurs to dimension i.e., DIM, then the user profile needs to be updated. Thus, it must be understood to a person skilled in art that the migration controls is not limited to rules, but it may also be applied on dimensions. Considering another real-life example in which new rules are configured which says that the discount on a particular product is increased from 20% to 35%. Thus, the rule orchestration system 102 identifies a target system amongst plurality of target systems 103 and update this information automatically i.e., in a real-time. Thus, next time when someone buys that product, he/she may avail 35% discount.

Figure 3:
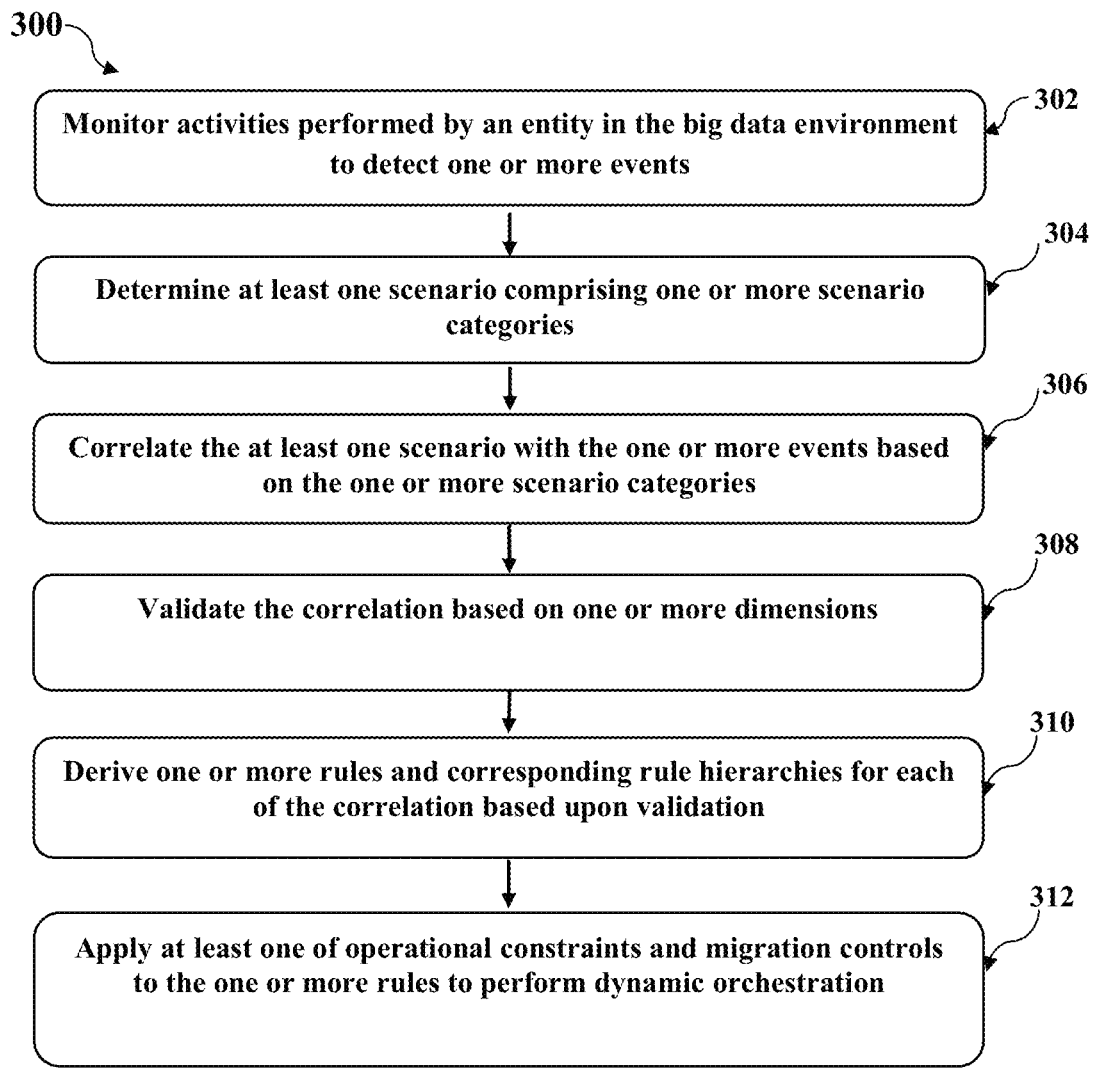
FIG. 3 shows a flowchart illustrating a method of performing dynamic orchestration of rules in the big data environment in accordance with some embodiments of the present disclosure.

FIG. 3 shows a flowchart illustrating a method for performing dynamic orchestration of rules in a big data environment with some embodiments of the present disclosure.

As illustrated in FIG. 3, the method 300 comprises one or more blocks for dynamically performing dynamic orchestration of rules using a rule orchestration system 102. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 302, the rule orchestration system 102 monitors activities performed by an entity in the big data environment to detect one or more events. The one or more events may be associated with at least one of a product and a service.

At block 304, the rule orchestration system 102 determines at least one scenario by analyzing data (i.e., the scenario data-set 218) pertaining to the at least one of the product and the service. Further, the at least one scenario comprises one or more scenario categories.

At block 306, the rule orchestration system 102 correlates the at least one scenario with the one or more events based on the one or more scenario categories.

At block 308, the rule orchestration system 102 validates the correlation between the at least one scenario and the one or more events based on one or more dimensions. Further, the one or more dimensions indicate parameters affecting the at least one scenario.

At block 310, the rule orchestration system 102 derives one or more rules and corresponding rule hierarchies for each of the correlation of the at least one scenario and the one or more events upon validation.

At block 312, the rule orchestration system 102 applies at least one of operational constraints and migration controls to the one or more rules to perform dynamic orchestration. Thus, in this way, the rule orchestration system 102 performs the dynamic orchestration of the rules in a big data environment.

Computer System

Figure 4:
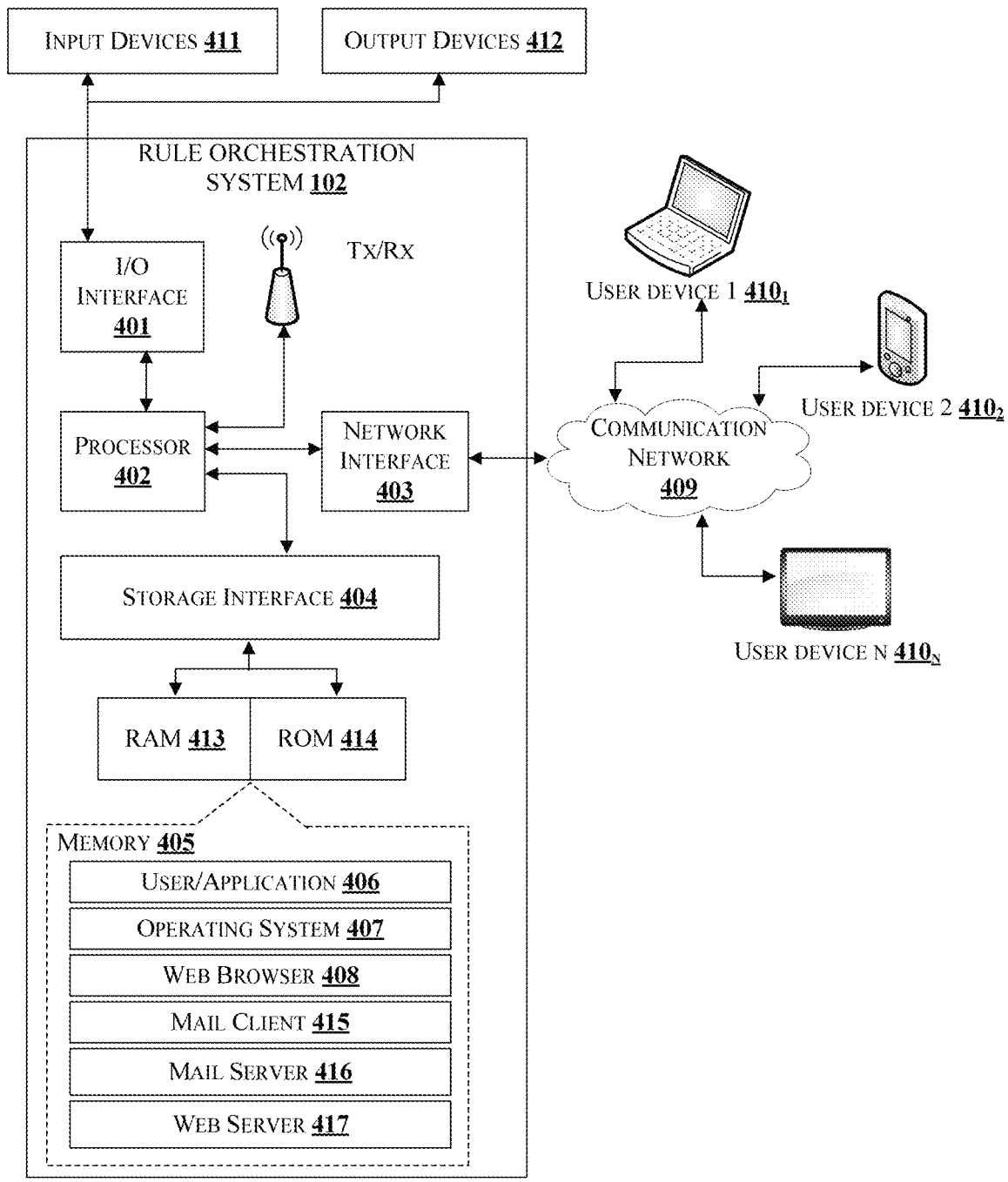
FIG. 4 illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 can be the rule orchestration system 102 which is used for performing dynamic orchestration of rules. The computer system 400 may comprise a central processing unit ("CPU" or "processor") 402. The processor 402 may comprise at least one data processor for executing program components for executing user- or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application data 406, an operating system 407, web browser 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. I/O interface 401 may facilitate display, execution, interaction, manipulation, or operation of program components through textual or graphical facilities. For example, I/O interface may provide computer interaction interface elements on a display system operatively connected to the computer system 400, such as cursors, icons, check boxes, menus, windows, widgets, etc. Graphical User Interfaces (GUIs) may be employed, including, without limitation, Apple Macintosh operating systems'

Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides a method for performing dynamic orchestration of rules in a big data environment based on context of the scenario.

In an embodiment, the method of present disclosure provides a single solution not only to help in making decisions smoothly but it also quantifies the possible tradeoffs.

In an embodiment, the method of present disclosure provides consistency in the automation of the rule orchestration across the enterprises to integrate with multiple target systems such as Kiosk, POS, Portable Device, Mobile Handheld Device, and Computer.

In an embodiment, the method of present disclosure provides visibility and transparency of overall performance of products/services in different scenario categories of the scenarios.

In an embodiment, the method of present disclosure provides real-time event monitoring and evaluation in correlation with scenario to assess the characteristics of the product/services in terms of participants of big data ecosystem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for performing dynamic orchestration of rules in a big data environment, the method comprising:
monitoring, by a rule orchestration device, activities performed by an entity in the big data environment to detect one or more events, wherein the one or more events are associated with at least one of a product or a service;
determining, by the rule orchestration device, at least one scenario by analyzing data associated with consumer buying behavior and historical data of the at least one of the product and the service, wherein the at least one scenario comprises one or more scenario categories, wherein the one or more scenario categories are determined based on a utilization map associated with the at least one of the product and the service or interrelationship among the product and the service;

correlating, by the rule orchestration device, the at least one scenario with the one or more events based on the one or more scenario categories;

validating, by the rule orchestration device, the correlation between the at least one scenario and the one or more events based on one or more dimensions, wherein the one or more dimensions indicate features of consumer buying behavior that affect the at least one scenario;

deriving, by the rule orchestration device, one or more rules and corresponding rule hierarchies for each of the correlation of the at least one scenario and the one or more events upon validation; and applying, by the rule orchestration device, at least one of operational constraints and migration controls to the one or more rules to perform dynamic orchestration.

2. The method as claimed in claim 1, wherein the determining the at least one scenario further comprises:

receiving, by the rule orchestration device, one or more predefined scenarios from a scenario database;

comparing, by the rule orchestration device, the at least one scenario with the one or more predefined scenarios to determine whether the at least one scenario is preexisting in the scenario database; and updating, by the rule orchestration device, the at least one scenario in the scenario database based on the comparing.

3. The method as claimed in claim 1, wherein the determining the at least one scenario further comprises validating the at least one scenario based on the one or more dimensions.

4. The method as claimed in claim 1 further comprises:

determining, by the rule orchestration device, whether the one or more dimensions are defined to correlate with the at least one scenario;

associating, by the rule orchestration device, the data pertaining to the at least one of the product and the service with big data query specification based on the determining; and deriving, by the rule orchestration device, the one or more dimensions based on the association.

5. The method as claimed in claim 1, wherein the one or more dimensions comprises at least one of predefined technology dimensions, application dimensions, social dimensions, economic dimensions, geolocation dimensions and legal dimensions.

6. The method as claimed in claim 1, wherein the deriving the one or more rules further comprises:

determining, by the rule orchestration device, whether the one or more rules are predefined in a rule database;

identifying, by the rule orchestration device, a level of the one or more rules based on a rules hierarchy based on the determining, wherein the rules hierarchy is updated dynamically based on the data pertaining to the at least one of the product and the service; and adding, by the rule orchestration device, the one or more rules to the rule database along with the level.

7. The method as claimed in claim 1 further comprises:

deriving, by the rule orchestration device, the migration controls to continuously migrate the one or more rules to one or more target systems; and defining, by the rule orchestration device, the operational constraints in association with the migration controls.

8. A rule orchestration device for performing dynamic orchestration of rules in a big data environment, the rule orchestration device comprising:

a processor; and a memory communicatively coupled to the processor, wherein the memory stores processor-executable instructions, which, on execution, causes the processor to:

monitor activities performed by an entity in the big data environment to detect one or more events, wherein the one or more events are associated with at least one of a product and a service;

determine at least one scenario by analyzing data associated with consumer buying behavior and historical data of the at least one of the product and the service, wherein the at least one scenario comprises one or more scenario categories, wherein the one or more scenario categories are determined based on a utilization map associated with the at least one of the product and the service or interrelationship among the product and the service;

correlate the at least one scenario with the one or more events based on the one or more scenario categories;

validate the correlation between the at least one scenario and the one or more events based on one or more dimensions, wherein the one or more dimensions indicate features of consumer buying behavior that affect the at least one scenario;

derive one or more rules and corresponding rule hierarchies for each of the correlation of the at least one scenario and the one or more events upon validation; and apply at least one of operational constraints and migration controls to the one or more rules to perform dynamic orchestration.

9. The rule orchestration device as claimed in claim 8 determines the at least one scenario by further performing steps to:

receive one or more predefined scenarios from a scenario database;

compare the at least one scenario with the one or more predefined scenarios to determine whether the at least one scenario is preexisting in the scenario database; and update the at least one scenario in the scenario database based on the comparing.

10. The rule orchestration device as claimed in claim 8 determines the at least one scenario by validating the at least one scenario based on the one or more dimensions.

11. The rule orchestration device as claimed in claim 8 further configured to:

determine whether the one or more dimensions are defined to correlate with the at least one scenario;

associate the data pertaining to the at least one of the product and the service with big data query specification based on the determining; and derive the one or more dimensions based on the association.

12. The rule orchestration device as claimed in claim 8, wherein the one or more dimensions comprises at least one of predefined technology dimensions, application dimensions, social dimensions, economic dimensions, geolocation dimensions and legal dimensions.

13. The rule orchestration device as claimed in claim 8 derives the one or more rules by performing steps to:

determine whether the one or more rules are predefined in a rule database;

identify a level of the one or more rules based on a rules hierarchy based on the determining, wherein the rules hierarchy is updated dynamically based on the data pertaining to the at least one of the product and the service; and add the one or more rules to the rule database along with the level.

14. The rule orchestration device as claimed in claim 8 further configured to:

derive the migration controls to continuously migrate the one or more rules to one or more target systems; and define the operational constraints in association with the migration controls.

15. A non-transitory computer readable medium having stored thereon instructions for performing dynamic orchestration of rules in a big data environment comprising executable code which when executed by a processor, causes the processor to perform steps that comprise:

monitoring activities performed by an entity in the big data environment to detect one or more events, wherein the one or more events are associated with at least one of a product and a service;

determining at least one scenario by analyzing data associated with consumer buying behavior and historical data of the at least one of the product and the service, wherein the at least one scenario comprises one or more scenario categories, wherein the one or more scenario categories are determined based on a utilization map associated with the at least one of the product and the service or interrelationship among the product and the service;

correlating the at least one scenario with the one or more events based on the one or more scenario categories;

validating the correlation between the at least one scenario and the one or more events based on one or more dimensions, wherein the one or more dimensions indicate features of consumer buying behavior that affect the at least one scenario;

deriving one or more rules and corresponding rule hierarchies for each of the correlation of the at least one scenario and the one or more events upon validation; and applying at least one of operational constraints or migration controls to the one or more rules to perform dynamic orchestration.

16. The medium as claimed in claim 15, wherein the instructions further cause the processor to determine the at least one scenario by:

receiving one or more predefined scenarios from a scenario database;

comparing the at least one scenario with the one or more predefined scenarios to determine whether the at least one scenario is preexisting in the scenario database; and updating the at least one scenario in the scenario database based on the comparing.

17. The medium as claimed in claim 15, wherein the instructions further cause the processor to determine the at least one scenario by validating the at least one scenario based on the one or more dimensions.

18. The medium as claimed in claim 15, wherein the instructions further cause the processor to:

determine whether the one or more dimensions are defined to correlate with the at least one scenario;

associate the data pertaining to the at least one of the product and the service with big data query specification based on the determining; and derive the one or more dimensions based on the association.

19. The medium as claimed in claim 15, wherein the instructions further cause the processor to derive the one or more rules by:

determining whether the one or more rules are predefined in a rule database;

identifying a level of the one or more rules based on a rules hierarchy based on the determining, wherein the rules hierarchy is updated dynamically based on the data pertaining to the at least one of the product and the service; and adding the one or more rules to the rule database along with the level.

* * * * *